(12) United States Patent
Nakamura et al.

(10) Patent No.: US 11,212,287 B2
(45) Date of Patent: Dec. 28, 2021

(54) PROGRAM EXECUTION CONTROL METHOD, PROGRAM, RECORDING MEDIUM, WEB PAGE, TRANSMISSION SERVER, CLIENT, AND WEB SYSTEM

(71) Applicant: FUJIFILM Corporation, Tokyo (JP)

(72) Inventors: Hiroki Nakamura, Yokohama (JP); Hironori Yano, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 236 days.

(21) Appl. No.: 16/426,104

(22) Filed: May 30, 2019

(65) Prior Publication Data
US 2019/0372980 A1 Dec. 5, 2019

(30) Foreign Application Priority Data

May 31, 2018 (JP) .............................. JP2018-105036

(51) Int. Cl.
*H04L 29/06* (2006.01)
*H04L 29/08* (2006.01)
*G06F 16/955* (2019.01)

(52) U.S. Cl.
CPC ........ *H04L 63/101* (2013.01); *G06F 16/9566* (2019.01); *H04L 63/0876* (2013.01); *H04L 63/126* (2013.01); *H04L 63/14* (2013.01); *H04L 63/1441* (2013.01); *H04L 67/02* (2013.01); *H04L 67/42* (2013.01)

(58) Field of Classification Search
CPC ..... H04L 63/126; H04L 63/101; H04L 63/14; H04L 63/1441
See application file for complete search history.

(56) References Cited

U.S. PATENT DOCUMENTS

| 6,167,522 | A | 12/2000 | Lee et al. | |
|---|---|---|---|---|
| 10,867,016 | B2 * | 12/2020 | Gidley | .................... G06F 21/16 |
| 2009/0019525 | A1 | 1/2009 | Yu et al. | |
| 2014/0250526 | A1 * | 9/2014 | Khanna | ............... H04L 63/1483 |
| | | | | 726/22 |

(Continued)

FOREIGN PATENT DOCUMENTS

| JP | 2002-503364 A | 1/2002 |
|---|---|---|
| JP | 5409620 B2 | 2/2014 |

(Continued)

*Primary Examiner* — Chirag R Patel
(74) *Attorney, Agent, or Firm* — Studebaker & Brackett PC (57) ABSTRACT

Provided are a program execution control method capable of preventing a malicious third party from misappropriating a web application program, a program, a recording medium, a web page, a transmission server, a client, and a web system. In the program execution control method, the program, the recording medium, the web page, the transmission server, the client, and the web system, the web application program includes a list of identification information of authorized servers written by a low-level language, a determination program, and a processing program which are written by a low-level language. The determination program checks whether identification information of the transmission server extracted from a URI of a web page and identification information of an authorized server included in the list match each other, and limits execution of the processing program according to the check result.

20 Claims, 5 Drawing Sheets (56) References Cited

U.S. PATENT DOCUMENTS

2016/0241560 A1* 8/2016 Reshadi ................ H04L 63/101
2017/0116395 A1   4/2017 Yamamura
2017/0286544 A1* 10/2017 Hunt ................... H04L 63/0876
2018/0167412 A1* 6/2018 Barrett ................ H04L 63/1491

FOREIGN PATENT DOCUMENTS

JP  2016-162263 A   9/2016
WO  2015/190371 A1  12/2015

* cited by examiner

RESPONSIVENESS: LOW, COST: HIGH

FIG. 9

RESPONSIVENESS: HIGH, COST: LOW

FIG. 10

PROGRAM EXECUTION CONTROL METHOD, PROGRAM, RECORDING MEDIUM, WEB PAGE, TRANSMISSION SERVER, CLIENT, AND WEB SYSTEM

CROSS-REFERENCE TO RELATED APPLICATIONS

The present application claims priority under 35 U.S.C. § 119 to Japanese Patent Application No. 2018-105036, filed on May 31, 2018. The above application is hereby expressly incorporated by reference, in its entirety, into the present application.

BACKGROUND OF THE INVENTION

1. Field of the Invention

The present invention relates to a program execution control method of a web application program that is included in a web page transmitted from a transmission server and received in a client, and is executed in a web browser of the client, a program, a recording medium, a web page, a transmission server, a client, and a web system.

2. Description of the Related Art

For example, in a case where image processing such as image (photo) correction processing is performed, in the related art, a user has installed a dedicated program for performing the image processing in a client, and the image processing has been performed using the dedicated program. Further, as shown in a conceptual diagram of FIG. 8, a user uploads an image to a dedicated server 32 for image processing from a client 34, performs image processing by an image processing program in the dedicated server 32, and then, the image-processed image is downloaded to the client 34 from the dedicated server 32.

Figure 8:
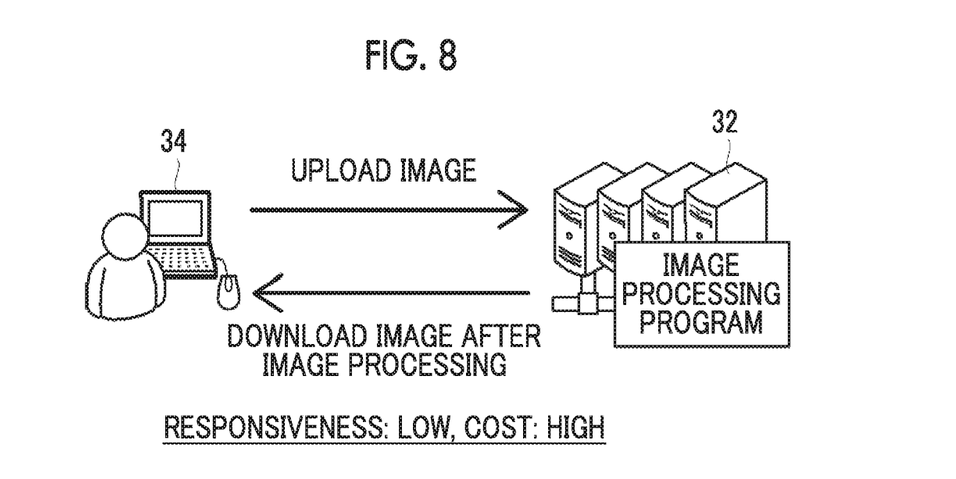
FIG. 8 is a conceptual diagram showing an example of an operation of a related-art web system.

However, in a method that uses such a dedicated program, there is a case where a user hesitates to use the dedicated program for the reason that it is troublesome to install the dedicated program in a client. Further, in a method that uses the dedicated server 32, since it is necessary to upload and download an image, responsiveness becomes low. Further, communication cost for uploading and downloading the image becomes high. In addition, the dedicated server 32 is necessary, which causes an increase in cost.

On the other hand, recently, in a web browser of a client, image processing can be performed in the web browser using a web application program for image processing.

Figure 9:
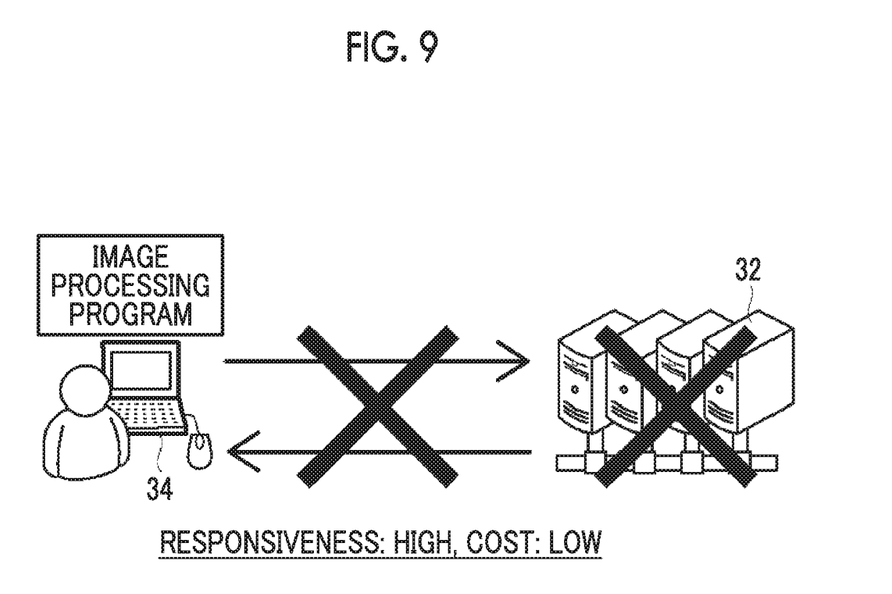
FIG. 9 is a conceptual diagram showing another example of the operation of the related-art web system.

In this method, as shown in a conceptual diagram of FIG. 9, since a user can perform image processing using an image processing program in a web browser of the client 34, it is not necessary to upload and download an image, which leads to an advantage that responsiveness becomes high. Thus, the communication cost for uploading and downloading the image is not necessary. Further, the dedicated server 32 for performing image processing is not necessary, which leads to low cost.

Figure 10:
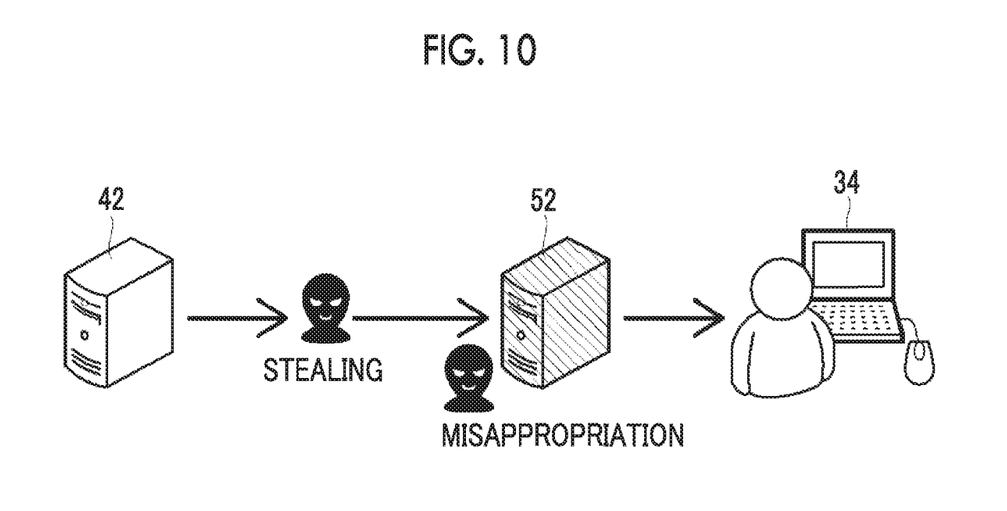
FIG. 10 is a conceptual diagram showing an example of an operation in a case where a web application is misused.

However, in the case of a method for operating a web application program on a web browser, as shown in FIG. 10, any user capable of browsing a web page can download a web page including the web application program to the client 34 from a transmission server 42 of the web page. Thus, there is a risk that the web application program is pulled out and stolen from the web page by a malicious third party and is misappropriated. For example, the web application program that is misappropriated may be distributed (transmitted) using a transmission server 52 of the malicious third party.

Here, as related-art techniques considered to be relevant to the present invention, there are JP2002-503364A, JP5409620B, WO2015/190371A, and JP2016-162263A.

JP2002-503364A discloses a method for receiving an application program that is associated with a transmission source identifier from a transmission source computer, determining a resource that a server that uses the application program can access to permit an access right based on the transmission source identifier, and loading the application program to a predetermined position in a memory of the server, for example.

JP5409620B discloses a method for generating a server side program having abstraction, converting the server side program including the abstraction into object codes that are guaranteed to be executed in a safe method with respect to a security standard to compile the server side program, and inserting security inspection to forcedly execute the security standard during compiling.

WO2015/190371A discloses an application program for requesting an inspection result of data in which an operating system is incorporated from the operating system at the time of starting or returning from background processing, prohibiting display of a predetermined screen in a case where the inspection result indicates that the data is not genuine, and incorporating genuine data into the operating system.

JP2016-162263A discloses an application usage restricting program for determining, in a case where starting of an application is detected, whether the application is a restriction target application that is a usage restriction target, and repeatedly or continuously displaying a predetermined message screen and causing the restriction target application to enter a state where the restriction target application cannot be substantially used in a case where it is determined that the application is the restriction target application.

SUMMARY OF THE INVENTION

An object of the invention is to provide a program execution control method capable of preventing a malicious third party from misappropriating a web application program, a program, a recording medium, a web page, a transmission server, a client, and a web system.

In order to achieve the above-mentioned object, according to an aspect of the invention, there is provided a program execution control method of a web application program that is included in a web page transmitted from a transmission server and received in a client, and is executed on a web browser of the client, in which the web application program includes a list of identification information of authorized servers for which distribution of the web application program is authorized, a determination program for determining whether the transmission server is the authorized server, and one or more processing programs for executing a process other than the determination program, the list, the determination program, and the one or more processing programs being written by a low-level language, and in the program execution control method, the determination program includes: a first step of acquiring a URI of the web page; a second step of extracting identification information of the transmission server from the URI of the web page; a third step of checking whether the identification information of the transmission server and the identification information of the authorized server included in the list match each other;

and a fourth step of limiting execution of the one or more processing programs in accordance with a result of the check.

It is preferable that the third step includes a step of authorizing execution of a part or an entirety of the one or more processing programs in a case where the identification information of the transmission server and the identification information of the authorized server included in the list match each other, and a step of prohibiting the execution of the one or more processing programs in a case where the identification information of the transmission server and the identification information of the authorized server included in the list do not match each other.

It is preferable that the third step includes a step of determining authorization of execution of a part of the one or more processing programs or authorization of execution of the entirety of the one or more processing programs, in accordance with the identification information of the transmission server.

It is preferable that the determination program further includes a fifth step of forcedly terminating execution of the determination program in a case where the identification information of the transmission server and the identification information of the authorized server included in the list do not match each other.

It is preferable that the determination program further includes a fifth step of redirection from the web page of which the URI is acquired to another web page in a case where the identification information of the transmission server and the identification information of the authorized server included in the list do not match each other.

It is preferable that the third step includes a step of checking whether the identification information of the transmission server and the identification information of the authorized server included in the list completely match each other.

It is preferable that the identification information of the authorized server included in the list is a character string indicating the identification information of the authorized server, and the third step includes a step of checking whether a character string of the identification information of the transmission server and a character string of the identification information of the authorized server included in the list match each other.

It is preferable that the identification information of the authorized server included in the list is a hash value corresponding to a character string indicating the identification information of the authorized server, and the third step includes a step of checking whether a hash value calculated from the identification information of the transmission server and a hash value of the identification information of the authorized server included in the list match each other.

It is preferable that the identification information of the authorized server included in the list is an encoded character string indicating the identification information of the authorized server, and the third step includes a step of checking whether a character string of the identification information of the transmission server and a character string of the identification information of the authorized server decoded from the encoded character string of the identification information of the authorized server included in the list match each other.

It is preferable that the identification information is a domain name.

It is preferable that the list includes domain names and directory names of the authorized servers, and the third step includes a step of checking whether a domain name and a directory name of the transmission server and a domain name and a directory name of the authorized server included in the list match each other.

It is preferable that the third step includes a step of checking whether a partial domain name including an organization name in the domain name of the transmission server and a partial domain name including an organization name in the domain name of the authorized server included in the list match each other.

It is preferable that the low-level language is an assembly language.

It is preferable that the assembly language is an assembly language of WebAssembly.

According to another aspect of the invention, there is provided a web application program for causing a computer to execute the respective steps of the determination program on the web browser of the client.

According to still another aspect of the invention, there is provided a non-transitory computer-readable recording medium on which the web application program is recorded, the web application program causing a computer to execute the respective steps of the determination program on the web browser of the client.

According to still another aspect of the invention, there is provided a web page that includes the web application program, is transmitted from the transmission server, is received in the client, and is displayed on the web browser of the client.

According to still another aspect of the invention, there is provided a transmission server that receives a transmission request of a web page including the web application program from the client, and transmits the web page corresponding to the transmission request to the client that has transmitted the transmission request.

According to still another aspect of the invention, there is provided a client that transmits a transmission request of a web page including the web application program to the transmission server, receives the web page corresponding to the transmission request, transmitted from the transmission server, displays the web page on the web browser, and executes the web application program on the web browser.

According to still another aspect of the invention, there is provided a web system comprising: one or more transmission servers described above; and one or more clients described above.

According to the aspects of the invention, the list, the determination program, and the one or more processing programs are written by a low-level language that it is difficult for humans to understand. Accordingly, it is difficult for a malicious third party to analyze a web application program, to tamper with the web application program, and to pull out the web application program from the web page for stealing, and thus, it is possible to prevent the malicious third party from misappropriating the web application program.

DESCRIPTION OF THE PREFERRED EMBODIMENTS

Hereinafter, a program execution control method, a program, a recording medium, a web page, a transmission server, a client, and a web system will be described in detail on the basis of preferred embodiments shown in the accompanying drawings.

Figure 1:
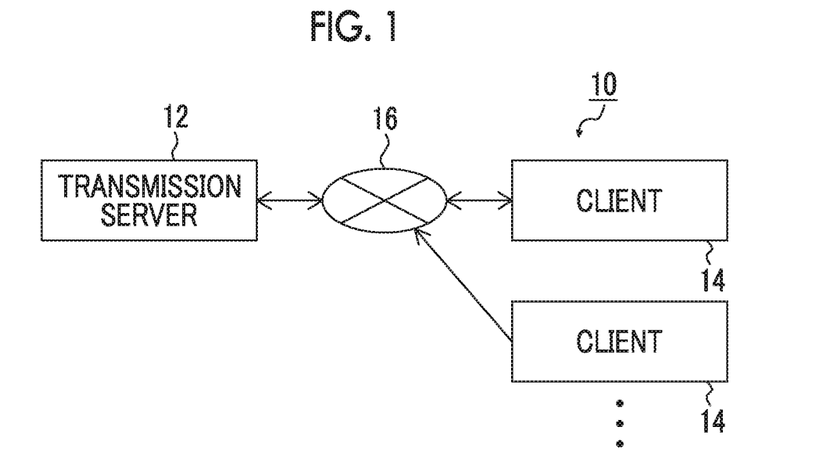
FIG. 1 is a block diagram showing a configuration of a web system according to an embodiment of the invention.

FIG. 1 is a block diagram showing a configuration of a web system according to an embodiment of the invention. A web system 10 shown in FIG. 1 includes a transmission server 12, and one or more clients 14. The web system 10 displays a web page that is transmitted from the transmission server 12 through a communication line 16 such as the Internet and is received in the client 14 on a web browser of the client 14, and executes a web application program relating to the invention included in the web page on the web browser.

The transmission server 12 receives a web page transmission request from the client 14, and transmits a web page (data of the web page) corresponding to the transmission request to the client 14 that has transmitted the transmission request. As the transmission server 12, a variety of computers having a function of distributing web pages, for example, a work station may be used. One or more transmission servers 12 may be provided.

On the other hand, the client 14 transmits a web page transmission request to the transmission server 12, receives a web page corresponding to the transmission request, transmitted from the transmission server 12, displays the web page on the web browser, and executes the web application program of the invention included in the web page on the web browser. The client 14 transmits a uniform resource identifier (URI) indicating an address of the web page to the transmission server 12, as the transmission request of the web page. As the client 14, a variety of computers having a function for browsing web pages, for example, a desktop personal computer (PC), a note PC, a tablet PC, a smartphone, or the like may be used.

The URI is expressed as, for example, "http://www.xxx.co.jp/yyy/". In the URI, "http" represents a communication protocol, and "www" represents a host name. "xxx.co.jp" represents a domain name, in which "xxx" represents an organization name, "co" represents a second level domain name indicating a type of an organization, and "jp" represents a top level domain name indicating a country, a region, a purpose of use, an organization for use, or the like. "yyy" represents a directory name. The URI may include a URI in which a host name is not present, such as "http://xxx.co.jp/", or a URI in which a second level domain name is not present, such as "http://www.xxx.jp/".

The web page is transmitted from the transmission server 12 in accordance with the transmission request from the client 14, is received by the client 14, and is displayed on the web browser of the client 14. The web page includes a program (hereinafter, may be referred to as an HTML program") 18 written by a hypertext markup language (HTML) that is a markup language for writing a hypertext, as shown in the conceptual diagram of FIG. 4, a program (hereinafter, may be referred to as a JavaScript program") 20 written by JavaScript (registered trademark, which is the same hereinafter) that is a script language (which will be described later), an image or the like, the web application program according to the embodiment of the invention, that is, a program (hereinafter, may be referred to as a WebAssembly program" written by an assembly language of WebAssembly (which will be described later)) 22, and the like.

Figure 4:
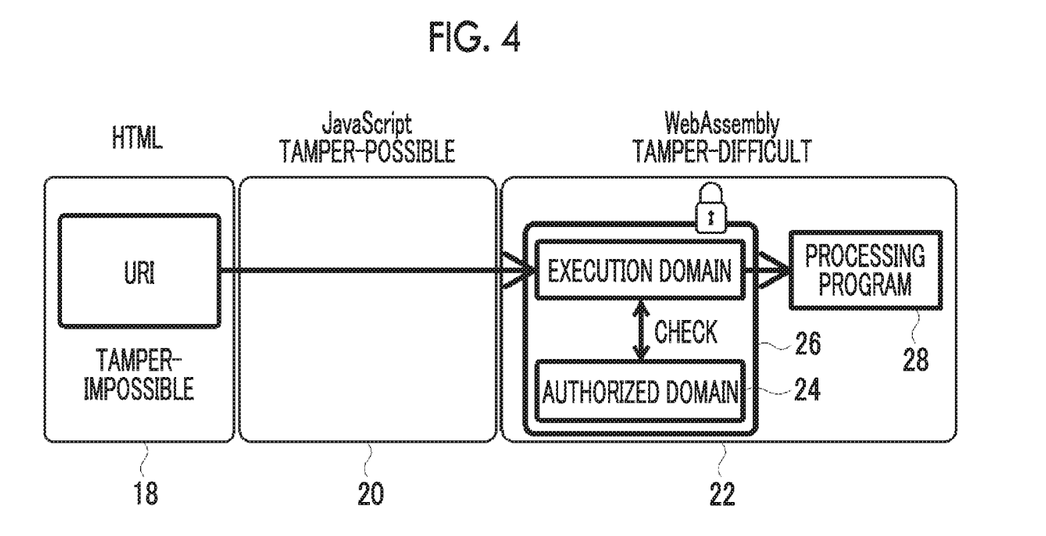
FIG. 4 is a conceptual diagram showing a configuration of a web application program according to the embodiment of the invention.

The web application program according to the embodiment of the invention is executed on the web browser of the client 14, and as shown in the conceptual diagram of FIG. 4, includes a list 24 of domain names of authorized servers (transmission servers) for which distribution (transmission) of the web application program according to the embodiment of the invention is authorized, a determination program 26 for determining whether the transmission server 12 is an authorized server, one or more processing programs 28 for executing a process other than the determination program 26, such as image processing, and the like. Further, at least the list 24, the determination program 26, and one or more processing programs 28 among the web application programs according to the embodiment of the invention are written by a low-level language.

The domain name of the authorized server may be a character string (text format) indicating the domain name of the authorized server, a hash value corresponding to the character string indicating the domain name of the authorized server, or an encoded character string of the character string indicating the domain name of the authorized server.

The low-level language refers to a programming language written by command sets that it is difficult for humans to understand among programming languages for writing a program for operating a computer. The low-level language includes a machine language through which a computer can directly understand details of a command (binary format) and can execute the command, an assembly language written by a command (text format) of a name (mnemonics) corresponding to a command (binary format) of a machine language one to one, and the like.

On the other hand, a high-level language refers to a programming language written by a syntax or the like (text format) that it is easy for humans to understand, compared with the low-level language, among the programming languages. The high-level language includes a script language capable of writing an operation, a function, and the like of a program.

Further, as the low-level language for writing the web application program, a variety of assembly languages may be used. Currently, a representative assembly language is an assembly language of WebAssembly. On the other hand, as the high-level language, a variety of script languages may be used. Currently, a representative script language is a script language of JavaScript.

WebAssembly is formulated as an open standard by W3C WebAssembly Community Group of the World Wide Web Consortium (W3C) that is an international community for promoting standardization of the World Wide Web (WWW) technology, and is able to operate a web application program of a binary format on a web browser at a high speed of a machine language (native application) level.

WebAssembly has characteristics that WebAssembly is installed in a representative web browser as a standard technology, it is not necessary to install an additional program such as a plugin program, conversion from a different script language such as C/C++ to the assembly language of WebAssembly is possible, existing program resources are usable, the size of a program is small, and WebAssembly is also executable in a platform with a different operating system, for example.

By using WebAssembly, there is a possibility that an application program for which a dedicated server, a dedicated plugin application, and the like are necessary in the related art, may be executed only using a web browser. As a usage field of WebAssembly, an application that needs a high responsiveness, such as a game, an application that takes time for complicated processing, such as image processing, or the like, may be considered.

JavaScript is standardized as ECMAScript (ECMA-262) by Ecma International that is an international standardization organization in the field of an information communication system, and is able to realize elements of movement, various effects, dialogue functions with users, and the like on a web page.

In a case where a process realized by the JavaScript is complicated, there are problems in that an execution speed of JavaScript becomes slow and a data size becomes large. WebAssembly has been developed for solving the above-mentioned problems of JavaScript and is written by an assembly language, and has thus characteristics that its execution speed is fast and its data size is small compared with JavaScript written by a script language.

Figure 2:
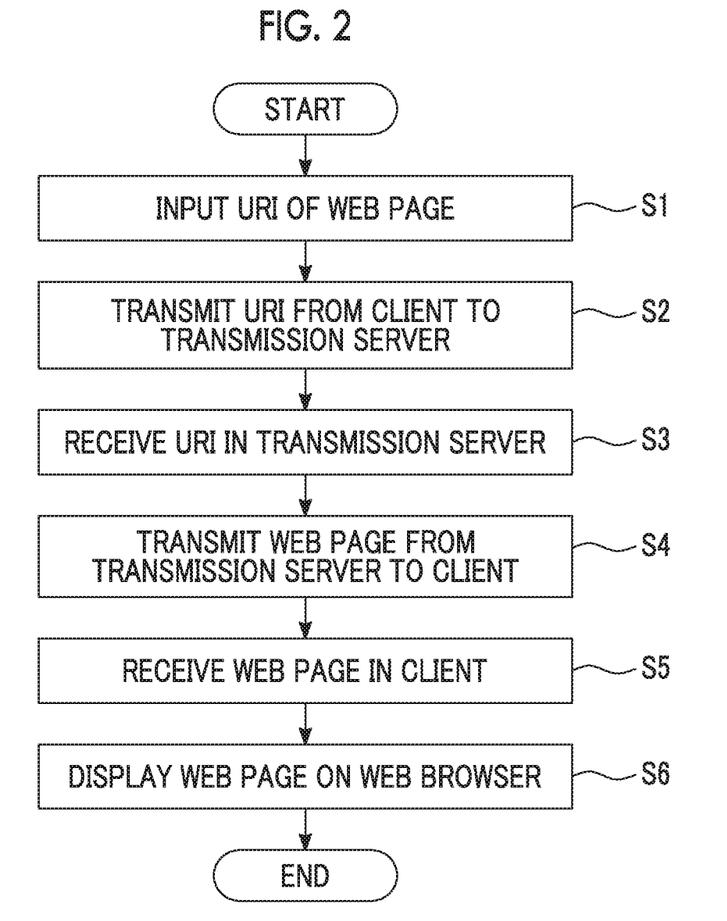
FIG. 2 is a flowchart showing an operation of the web system shown in FIG. 1, according to the embodiment of the invention.

Next, an operation of the web system 10 will be described according to the program execution control method according to the invention with reference to a flowchart shown in FIG. 2. First, an operation until a web page is displayed on a web browser of the client 14 will be described.

A URI of a web page is input to an address bar of the web browser of the client 14 from a user (step S1). It may be considered that it is impossible or very difficult to tamper with the URI of the web page.

After the URI of the web page is input, the URI is transmitted to the transmission server 12 from the client 14 as a web page transmission request (step S2), and is received in the transmission server 12 (step S3).

After the web page transmission request is received in the transmission server 12, a web page corresponding to the transmission request is transmitted from the transmission server 12 to the client 14 that has transmitted the transmission request (step S4), and is received in the client 14 that has transmitted the transmission request (step S5).

After the web page is received in the client 14, the web page is displayed on the web browser of the client 14 (step S6).

Subsequently, with reference to a flowchart of FIG. 3 and a conceptual diagram of FIG. 4, an operation of the web system 10 after the web page is displayed on the web browser of the client 14, that is, an operation of the web application program according to the embodiment of the invention will be described.

Figure 3:
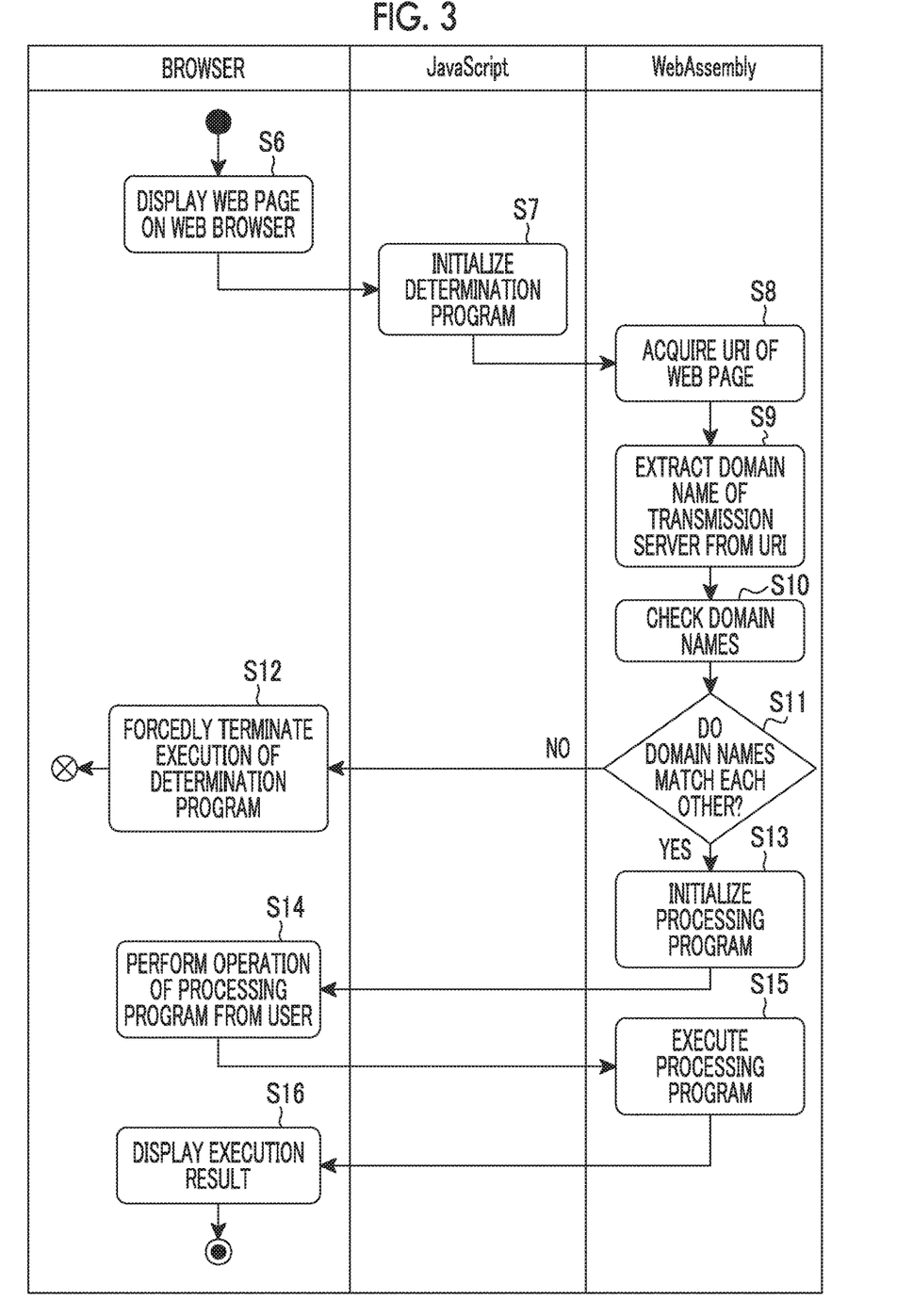
FIG. 3 is a flowchart showing the operation of the web system, subsequent to FIG. 2, according to the embodiment of the invention.

In the flowchart of FIG. 3, a left portion shows an operation on the web browser, that is, an operation of the HTML program 18. Further, a central portion shows an operation of the JavaScript program 20, and a right portion shows an operation of the WebAssembly program 22. Further, in the conceptual diagram of FIG. 4, a left portion shows a role of the HTML program 18. In addition, a central portion shows a role of the JavaScript program 20, and a right portion shows a role of the WebAssembly program 22.

After the web page is displayed on the web browser of the client 14 (step S6), the web application program of the embodiment of the invention included in the web page, that is, the WebAssembly program 22 is executed. In this case, first, the determination program 26 of the WebAssembly program 22 is initialized by the JavaScript program 20 (step S7).

After the initialization is terminated, the determination program 26 is executed, so that the URI of the web page input to the address of the web browser is first acquired (step S8). As shown in the conceptual diagram of FIG. 4, the WebAssembly program 22 acquires the URI of the web page from the HTML program 18 through the JavaScript program 20 that plays a role of mediating between the HTML program 18 and the WebAssembly program 22.

Subsequently, a domain name of the transmission server 12 is extracted from the URI of the web page acquired in step S8 (step S9).

After the domain name is extracted, as shown in the right portion of the conceptual diagram of FIG. 4, it is checked whether the domain name (execution domain name) of the transmission server 12 extracted in step S9 and a domain name (authorized domain name) of an authorized server included in the above-mentioned list 24 match each other (step S10).

In accordance with the domain name check result in step S10, execution of the above-mentioned one or more processing programs 28 is restricted.

For example, in a case where the domain name of the transmission server 12 and the domain name of the authorized server included in the list 24 match each other, execution of a part or the entirety of one or more processing programs 28 is authorized on the web browser of the client 14. On the other hand, in a case where the domain name of the transmission server 12 and the domain name of the authorized server included in the list 24 do not match each other, execution of one or more processing programs 28 is not authorized (prohibited) on the web browser of the client 14.

As a result, in a case where the domain name of the transmission server 12 and the domain name of the authorized server included in the list 24 do not match each other ("NO" in step S11), the execution of one or more processing programs 28 is not authorized, and execution of the determination program 26, that is, execution of the web application is forcedly terminated (step S12).

Instead of forcedly terminating the execution of the determination program 26, redirection from the web page of which the URI is acquired to another web page may be performed. It is possible to cause the redirected other web page to have information on a web page that is a redirection source indicating which web page the other web page is redirected from, and thus, it is possible to easily specify a web site of a malicious third party who misappropriates the web application program, using the information.

On the other hand, in a case where the domain name of the transmission server 12 and the domain name of the authorized server included in the list 24 match each other ("YES" in step S11), in the web browser of the client 14, execution of a part or the entirety of one or more processing programs 28 is authorized. In this case, after one or more processing programs 28 are initialized (step S13), a user operates one or more processing programs 28 on the web browser of the client 14 of the user (step S14). Then, one or more processing programs 28 are executed on the web browser in accordance with the user's operation (step S15), and its execution result is displayed on the web browser (step S16).

Figure 5:
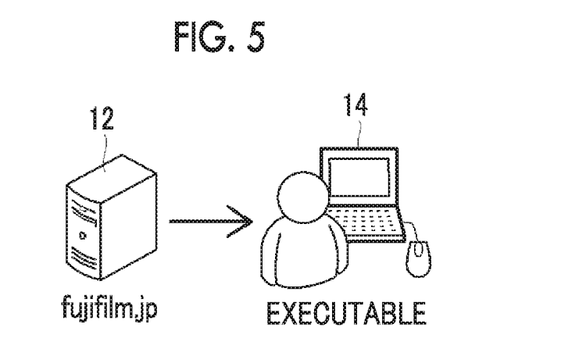
FIG. 5 is a conceptual diagram showing an operation of the web system in a case where domain names match each other according to the embodiment of the invention.
Figure 6:
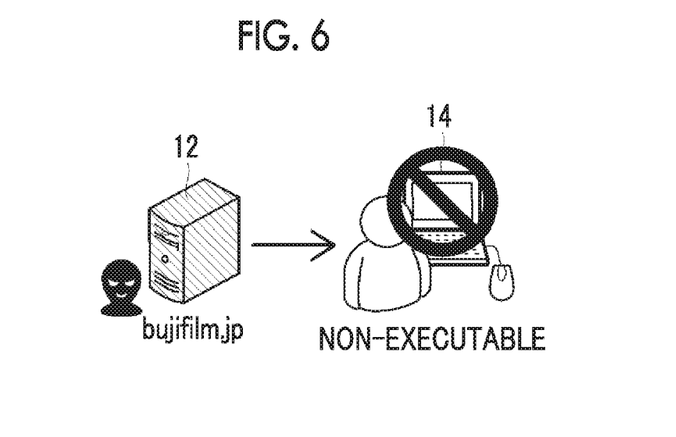
FIG. 6 is a conceptual diagram showing an operation of the web system in a case where domain names do not match each other according to the embodiment of the invention.

As shown in the conceptual diagram of FIG. 5, for example, in a case where the domain name of the authorized server included in the list 24 is "fujifilm.jp" and the domain name of the transmission server 12 is "fujifilm.jp" that is the same as the domain name of the authorized server, one or more processing programs 28 are executable on the web browser of the client 14. On the other hand, as shown in the conceptual diagram of FIG. 6, in a case where the domain name of the transmission server 12 is different from the domain name of the authorized server, for example, "bujifilm.jp", one or more processing programs 28 is not executable on the web browser of the client 14.

In the web system 10, the list 24, the determination program 26, and one or more processing programs 28 are written by the low-level language such as an assembly language of WebAssembly that it is difficult for humans to understand. Accordingly, it is difficult for a malicious third party to analyze the web application program, to tamper with the web application program, and to pull out the web application program from the web page for stealing, and thus, it is possible to prevent the malicious third party from misappropriating the web application program.

Figure 7:
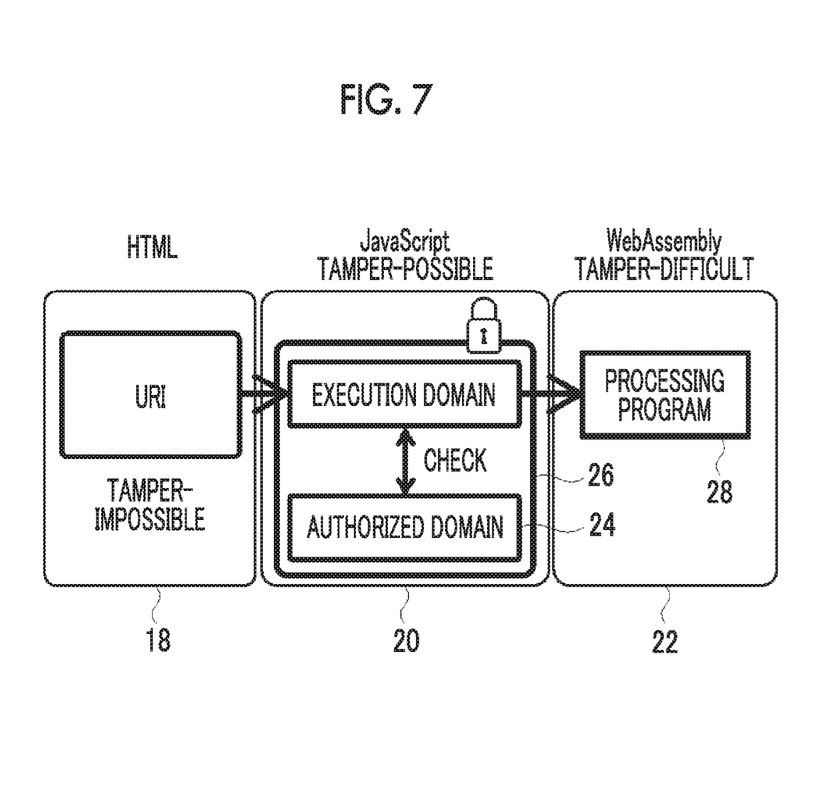
FIG. 7 is a conceptual diagram showing an example of another configuration of the web application program.

On the other hand, as shown in the conceptual diagram of FIG. 7, for example, a method of writing the list 24 and the determination program 26 by the JavaScript script language, and writing one or more processing programs 28 by the low-level language such as the assembly language of WebAssembly may be considered. In this case, the determination program 26 is written by a script language that it is easy for humans to understand. Accordingly, it is easy for a malicious third party to analyze the determination program 26 and tamper with the program, and to pull out the web application program from the web page for stealing. Thus, it is difficult to prevent the malicious third party from misappropriating the web application program.

In accordance with the domain name of the transmission server 12, authorization of execution of a part of one or more processing programs 28 or authorization of execution of the entirety of one or more processing programs 28 may be determined. For example, it is possible to control the execution of only the part or the entirety of one or more processing programs 28 in accordance with the domain names in such a manner that only the execution of the part of one or more processing programs 28 is authorized in a case where the domain name is "xxx" and the execution of the entirety of one or more processing programs 28 is authorized in a case where the domain name is "zzz".

Further, a configuration in which the list 24 includes a domain name and a directory name of an authorized server and it is checked whether a domain name and a directory name of the transmission server 12 and the domain name and the directory name of the authorized server included in the list 24 match each other may be employed. Thus, it is possible to prevent the web application program from being distributed unless both of the domain name and the directory name are correct, and to make it difficult for a malicious third party to analyze the web application program.

For example, in a case where a URI is "http://www.xxx.co.jp/yyy/", it may be checked whether "www.xxx.co.jp/yyy/" including a domain name and a directory name is correct.

Further, in a case where the domain name is checked, it may be checked whether the domain name of the transmission server 12 and the domain name of the authorized server included in the list 24 completely match each other, or it may be checked whether a partial domain name including an organization name in the domain name of the transmission server 12 and a partial domain name including an organization name in the domain name of the authorized server included in the list 24 match each other.

In the case of the URI, for example, it may be checked whether "xxx.co.jp" that is the domain name is completely correct. Further, it may be checked whether "xxx" that is an organization name is correct, whether "xxx.co" is correct, or "xxx", or whether "jp" is correct, for example.

Further, in a case where the domain name is checked, it may be checked whether a character string of the domain name of the transmission server 12 and a character string of the domain name of the authorized server included in the list 24 match each other, it may be checked whether a hash value calculated from the domain name of the transmission server 12 and a hash value of the domain name of the authorized server included in the list 24 match each other, or it may be checked whether the character string of the domain name of the transmission server 12 and a character string of the domain name of the authorized server decoded from an encoded character string of the domain name of the authorized server included in the list 24 match each other. By using the hash value or the encoded character string, it is possible to make it difficult for a malicious third party to analyze the domain name of the authorized server.

Hereinbefore, a specific example in which a domain name is used as identification information relating to the embodiment of the invention has been described, but the identification information is not limited to the domain name, and any type of identification information may be used, as long as it is identification information capable of identifying whether the transmission server 12 is an authorized server.

Further, the web application program according to the embodiment of the invention is not limited to the assembly language of WebAssembly, and for example, may be written by a variety of low-level languages such as a Portable Native Client (PNaCl).

In addition, the invention may be preferably applied to image processing such as image correction processing, a process of creating a photo album by layout of a plurality of images, or the like, but the invention is not limited thereto, and may be similarly applied to various web application programs.

A method according to the embodiment of the invention may be performed by the above-mentioned the web application program according to the invention for causing a computer to execute the respective steps of the determination program 26 on the web browser of the client 14. Further, it is also possible to provide a computer-readable recording medium on which the web application program according to the embodiment of the invention is recorded.

Hereinbefore, the embodiments of the invention have been described, but the invention is not limited to the above-mentioned embodiments, and a variety of modifications or changes may be made in a range without departing from the concept of the invention.

EXPLANATION OF REFERENCES

10: web system
12, 42, 52: transmission server
14, 34: client 16: communication line
18: HTML program
20: JavaScript program
22: WebAssembly program
24: list of domain names of authorized servers
26: determination program
28: processing program
32: dedicated server

What is claimed is:

1. A program execution control method of a web application program that is included in a web page transmitted from a transmission server and received in a client, and is executed on a web browser of the client,
wherein the web application program includes a list of identification information of authorized servers for which distribution of the web application program is authorized, a determination program for determining whether the transmission server is the authorized server, and one or more processing programs for executing a process other than the determination program, the list, the determination program, and the one or more processing programs being written by a low-level language, and
in the program execution control method, the determination program executed by the client includes:
a first step of acquiring a URI of the web page;
a second step of extracting identification information of the transmission server from the URI of the web page;
a third step of checking whether the identification information of the transmission server and the identification information of the authorized server included in the list match each other; and
a fourth step of limiting execution of the one or more processing programs in accordance with a result of the check.

2. The program execution control method according to claim 1,
wherein the third step includes a step of authorizing execution of a part or an entirety of the one or more processing programs in a case where the identification information of the transmission server and the identification information of the authorized server included in the list match each other, and a step of prohibiting the execution of the one or more processing programs in a case where the identification information of the transmission server and the identification information of the authorized server included in the list do not match each other.

3. The program execution control method according to claim 2,
wherein the third step includes a step of determining authorization of execution of a part of the one or more processing programs or authorization of execution of the entirety of the one or more processing programs, in accordance with the identification information of the transmission server.

4. The program execution control method according to claim 2,
wherein the determination program further includes a fifth step of forcedly terminating execution of the determination program in a case where the identification information of the transmission server and the identification information of the authorized server included in the list do not match each other.

5. The program execution control method according to claim 2,
wherein the determination program further includes a fifth step of redirection from the web page of which the URI is acquired to another web page in a case where the identification information of the transmission server and the identification information of the authorized server included in the list do not match each other.

6. The program execution control method according to claim 1,
wherein the third step includes a step of checking whether the identification information of the transmission server and the identification information of the authorized server included in the list completely match each other.

7. The program execution control method according to claim 1,
wherein the identification information of the authorized server included in the list is a character string indicating the identification information of the authorized server, and
the third step includes a step of checking whether a character string of the identification information of the transmission server and a character string of the identification information of the authorized server included in the list match each other.

8. The program execution control method according to claim 1,
wherein the identification information of the authorized server included in the list is a hash value corresponding to a character string indicating the identification information of the authorized server, and
the third step includes a step of checking whether a hash value calculated from the identification information of the transmission server and a hash value of the identification information of the authorized server included in the list match each other.

9. The program execution control method according to claim 1,
wherein the identification information of the authorized server included in the list is an encoded character string indicating the identification information of the authorized server, and
the third step includes a step of checking whether a character string of the identification information of the transmission server and a character string of the identification information of the authorized server decoded from the encoded character string of the identification information of the authorized server included in the list match each other.

10. The program execution control method according to claim 1,
wherein the identification information is a domain name.

11. The program execution control method according to claim 10,
wherein the list includes domain names and directory names of the authorized servers, and
the third step includes a step of checking whether a domain name and a directory name of the transmission server and a domain name and a directory name of the authorized server included in the list match each other.

12. The program execution control method according to claim 10,
wherein the third step includes a step of checking whether a partial domain name including an organization name in the domain name of the transmission server and a partial domain name including an organization name in the domain name of the authorized server included in the list match each other.

13. The program execution control method according to claim 1,
wherein the low-level language is an assembly language.

14. The program execution control method according to claim 13,
wherein the assembly language is an assembly language of WebAssembly.

15. The program execution control method according to claim 1,
wherein the web application program further includes a part written by a high-level language, and the part written by the high-level language performs at least one of elements of movement, various effects, dialogue functions with users and initialization of a program of the low-level language.

16. A non-transitory computer-readable recording medium on which a web application program that is included in a web page transmitted from a transmission server and received in a client is recorded,
wherein the web application program includes a list of identification information of authorized servers for which distribution of the web application program is authorized, a determination program for determining whether the transmission server is the authorized server, and one or more processing programs for executing a process other than the determination program, the list, the determination program, and the one or more processing programs being written by a low-level language, and
in the program execution control method, the determination program executed by the client includes:
a first step of acquiring a URI of the web page;
a second step of extracting identification information of the transmission server from the URI of the web page;
a third step of checking whether the identification information of the transmission server and the identification information of the authorized server included in the list match each other; and
a fourth step of limiting execution of the one or more processing programs in accordance with a result of the check, and
wherein the web application program causing a computer to execute the respective steps of the determination program on a web browser of the client.

17. A web page that includes a web application program on a non-transitory medium that is transmitted from a transmission server, and is received by a client,
wherein the web page is displayed and is executed on the web browser of the client,
wherein the web application program includes a list of identification information of authorized servers for which distribution of the web application program is authorized, a determination program for determining whether the transmission server is the authorized server, and one or more processing programs for executing a process other than the determination program, the list, the determination program, and the one or more processing programs being written by a low-level language, and
in the program execution control method, the determination program executed by the client includes:
a first step of acquiring a URI of the web page;
a second step of extracting identification information of the transmission server from the URI of the web page;
a third step of checking whether the identification information of the transmission server and the identification information of the authorized server included in the list match each other; and
a fourth step of limiting execution of the one or more processing programs in accordance with a result of the check.

18. A transmission server that receives a transmission request of a web page from a client, and transmits the web page corresponding to the transmission request to the client that has transmitted the transmission request, comprising:
a processor; and
a memory,
wherein the web page includes a web application program that is executed on a web browser of the client,
wherein the web application program includes a list of identification information of authorized servers for which distribution of the web application program is authorized, a determination program for determining whether the transmission server is the authorized server, and one or more processing programs for executing a process other than the determination program, the list, the determination program, and the one or more processing programs being written by a low-level language, and
in the program execution control method, the determination program executed by the client includes:
a first step of acquiring a URI of the web page;
a second step of extracting identification information of the transmission server from the URI of the web page;
a third step of checking whether the identification information of the transmission server and the identification information of the authorized server included in the list match each other; and
a fourth step of limiting execution of the one or more processing programs in accordance with a result of the check.

19. A client that transmits a transmission request of a web page to a transmission server, receives the web page corresponding to the transmission request, transmitted from the transmission server, displays the web page on a web browser, comprising:
a processor; and
a memory,
wherein the web page includes a web application program that is executed on the web browser of the client,
wherein the web application program includes a list of identification information of authorized servers for which distribution of the web application program is authorized, a determination program for determining whether the transmission server is the authorized server, and one or more processing programs for executing a process other than the determination program, the list, the determination program, and the one or more processing programs being written by a low-level language, and
in the program execution control method, the determination program executed by the client includes:
a first step of acquiring a URI of the web page;
a second step of extracting identification information of the transmission server from the URI of the web page;
a third step of checking whether the identification information of the transmission server and the identification information of the authorized server included in the list match each other; and a fourth step of limiting execution of the one or more processing programs in accordance with a result of the check.

20. A web system comprising:
one or more transmission servers that receive a transmission request of a web page from a client, and transmit the web page corresponding to the transmission request to the client that has transmitted the transmission request; and
one or more clients that transmit a transmission request of a web page to the transmission server, receive the web page corresponding to the transmission request, transmitted from the transmission server, and display the web page on a web browser,
wherein the web page includes a web application program that is executed on the web browser of the client,
wherein the web application program includes a list of identification information of authorized servers for which distribution of the web application program is authorized, a determination program for determining whether the transmission server is the authorized server, and one or more processing programs for executing a process other than the determination program, the list, the determination program, and the one or more processing programs being written by a low-level language, and
in the program execution control method, the determination program executed by the client includes:
a first step of acquiring a URI of the web page;
a second step of extracting identification information of the transmission server from the URI of the web page;
a third step of checking whether the identification information of the transmission server and the identification information of the authorized server included in the list match each other; and
a fourth step of limiting execution of the one or more processing programs in accordance with a result of the check.

\* \* \* \* \*